United States Patent
Visconti et al.

(10) Patent No.: US 9,216,859 B2
(45) Date of Patent: Dec. 22, 2015

(54) ROD RETENTION SYSTEM AND METHOD

(71) Applicant: Habasit AG, Reinach (CH)

(72) Inventors: Enrico Visconti, Caponago (IT); Marco Lucchi, Munchestein (CH)

(73) Assignee: Habasit AG, Reinach-Basel (CH)

( * ) Notice: Subject to any disclaimer, the term of this patent is extended or adjusted under 35 U.S.C. 154(b) by 0 days.

(21) Appl. No.: 13/887,238

(22) Filed: May 3, 2013

(65) Prior Publication Data

US 2014/0326584 A1 Nov. 6, 2014

(51) Int. Cl.
*B65G 17/08* (2006.01)
*B65G 15/30* (2006.01)

(52) U.S. Cl.
CPC .............. *B65G 15/30* (2013.01); *B65G 17/08* (2013.01); *B65G 2207/12* (2013.01); *B65G 2207/30* (2013.01); *Y10T 29/49826* (2015.01)

(58) Field of Classification Search
CPC ................................ B65G 15/30; B65G 17/08
See application file for complete search history.

(56) References Cited

U.S. PATENT DOCUMENTS

| | | | |
|---|---|---|---|
| 4,709,807 A | 12/1987 | Poerink | |
| 4,832,187 A | 5/1989 | Lapeyre | |
| 4,858,753 A | 8/1989 | Hodlewsky | |
| 4,886,158 A | 12/1989 | Lapeyre | |
| 4,934,518 A | 6/1990 | Lapeyre | |
| 4,949,838 A | 8/1990 | Lapeyre et al. | |
| 5,000,312 A | 3/1991 | Damkjaer | |
| 5,020,659 A | 6/1991 | Hodlewsky | |
| 5,096,053 A | 3/1992 | Hodlewsky | |
| 5,125,504 A | 6/1992 | Corlett et al. | |
| 5,156,262 A * | 10/1992 | Horton | 198/834 |
| 5,224,583 A | 7/1993 | Palmaer et al. | |
| 5,247,789 A | 9/1993 | Abbestam et al. | |
| 5,253,749 A | 10/1993 | Ensch | |
| 5,435,435 A | 7/1995 | Chiba et al. | |
| 5,461,852 A | 10/1995 | Nagamatsu | |
| 5,573,106 A | 11/1996 | Stebnicki | |
| 5,634,550 A | 6/1997 | Ensch et al. | |
| 5,645,160 A | 7/1997 | Palmaer et al. | |
| 5,678,683 A * | 10/1997 | Stebnicki et al. | 198/853 |
| 5,904,241 A * | 5/1999 | Verdigets et al. | 198/853 |

(Continued)

FOREIGN PATENT DOCUMENTS

| | | |
|---|---|---|
| FR | 2731416 | 9/1996 |
| JP | 20011171819 | 6/2001 |

(Continued)

OTHER PUBLICATIONS

International Search Report and Written Opinion, PCT/EP2014/058764, Jul. 31, 2014.

*Primary Examiner* — Gene Crawford
*Assistant Examiner* — Thomas Randazzo
(74) *Attorney, Agent, or Firm* — Hodgson Russ LLP

(57) ABSTRACT

The present disclosure provides belts (chains or brick-laid) having rod retains provided by way of an end module and a link cap for easier disassembly. The outer link end of the end module is altered to be narrower and furnished with a connecting structure. A separate link cap piece is produced, providing a corresponding connecting structure suitable to connect to the outer link end of the end module such that the width of the outer combined pieces is substantially the same as the other link ends of the belt. The link cap may be furnished with an opening allowing for assembly with a pivot rod.

39 Claims, 11 Drawing Sheets

(56) References Cited

U.S. PATENT DOCUMENTS

| | | |
|---|---|---|
| 5,918,730 A | 7/1999 | Wilcher |
| 5,960,937 A * | 10/1999 | Stebnicki et al. ............. 198/851 |
| 6,029,802 A | 2/2000 | Musiari et al. |
| 6,196,379 B1 * | 3/2001 | Van Esch et al. ............. 198/853 |
| 6,213,292 B1 * | 4/2001 | Takahashi et al. ............ 198/853 |
| 6,237,750 B1 | 5/2001 | Damkjaer et al. |
| 6,308,825 B1 * | 10/2001 | Nakamura ................... 198/853 |
| 6,345,715 B2 | 2/2002 | Palmaer |
| 6,662,938 B2 | 12/2003 | Damkjaer |
| 6,763,936 B2 | 7/2004 | Marsetti et al. |
| 7,108,127 B2 * | 9/2006 | Krisl ........................... 198/853 |
| 7,284,657 B2 | 10/2007 | Ulsh et al. |
| 7,331,447 B2 | 2/2008 | Krisl et al. |
| 7,766,159 B2 | 8/2010 | Krisl |
| 8,678,178 B2 * | 3/2014 | Bickel et al. .................. 198/778 |
| 2001/0042677 A1 | 11/2001 | Palmaer |
| 2008/0023304 A1 * | 1/2008 | Elsner .......................... 198/853 |
| 2011/0226593 A1 | 9/2011 | Hall et al. |
| 2012/0061213 A1 | 3/2012 | Memoli et al. |

FOREIGN PATENT DOCUMENTS

| | | |
|---|---|---|
| JP | 2004262600 | 9/2009 |
| WO | 0047498 | 8/2000 |
| WO | 2012074383 | 6/2012 |

\* cited by examiner

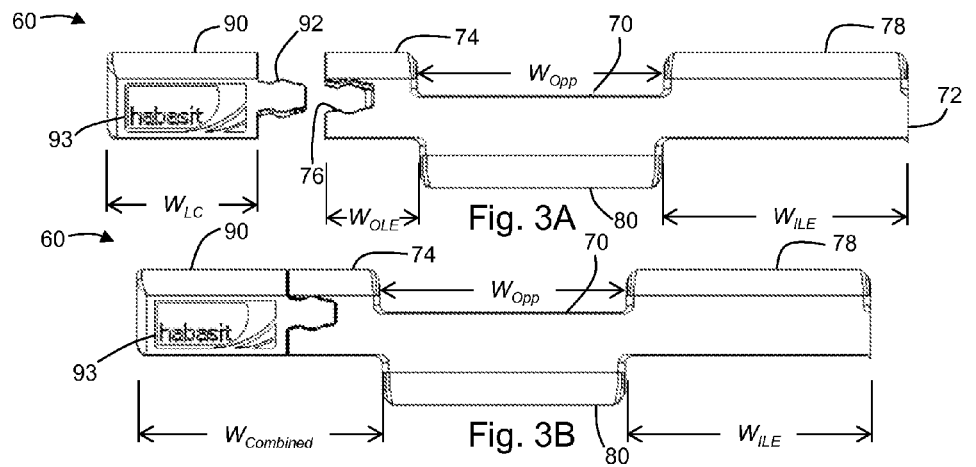
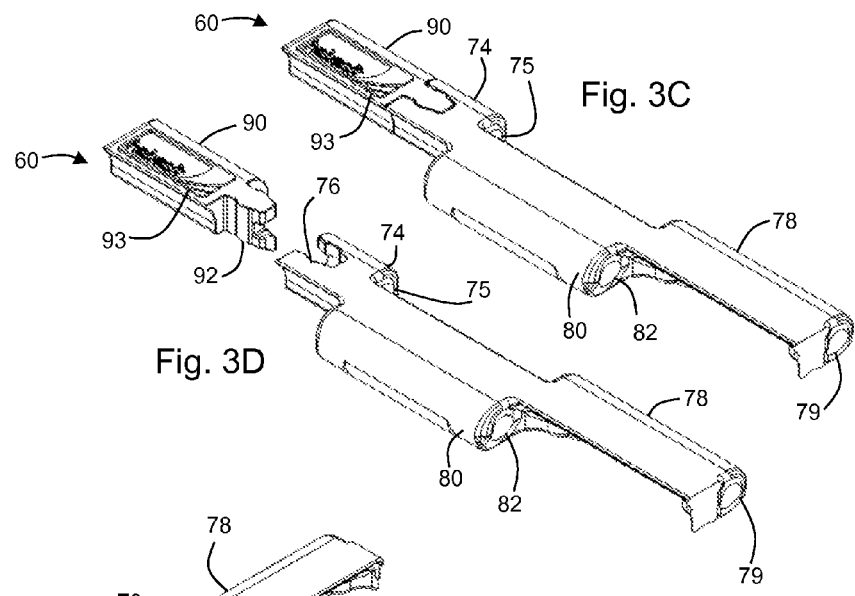
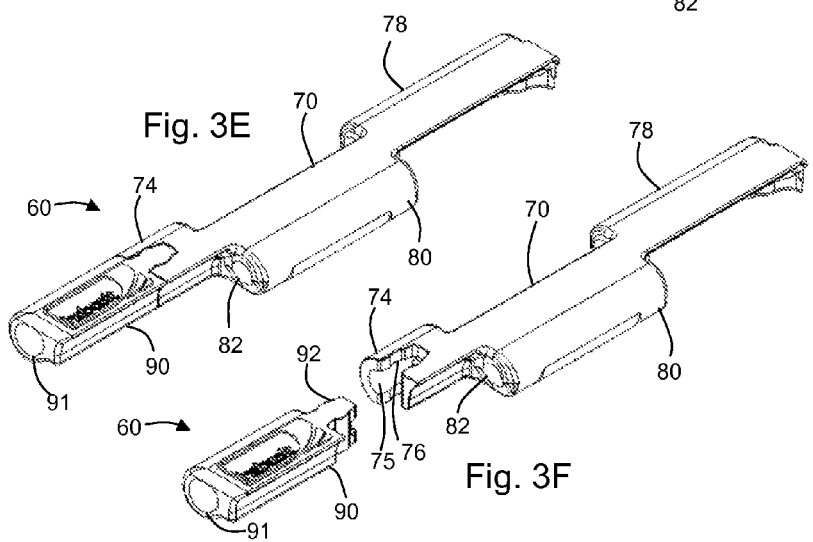

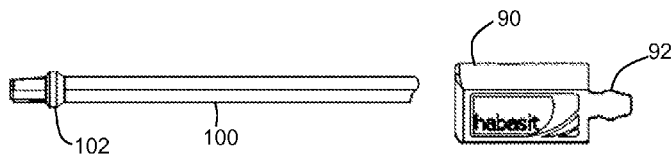
Fig. 4A
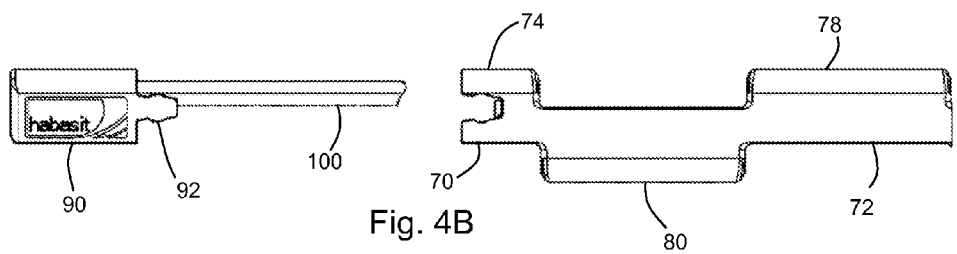
Fig. 4B
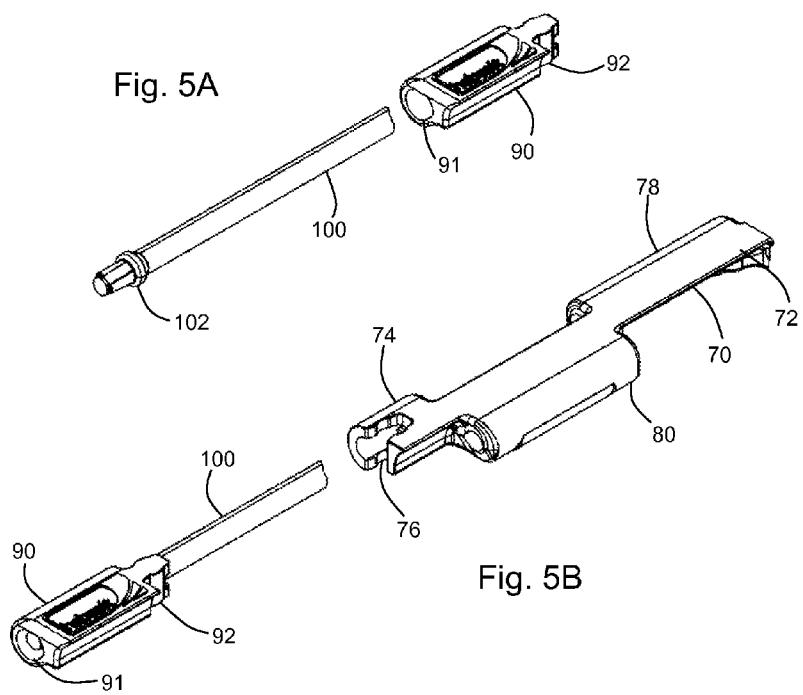
Fig. 5A
Fig. 5B

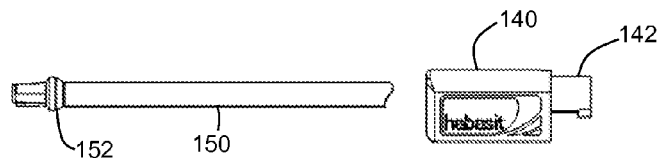
Fig. 6A
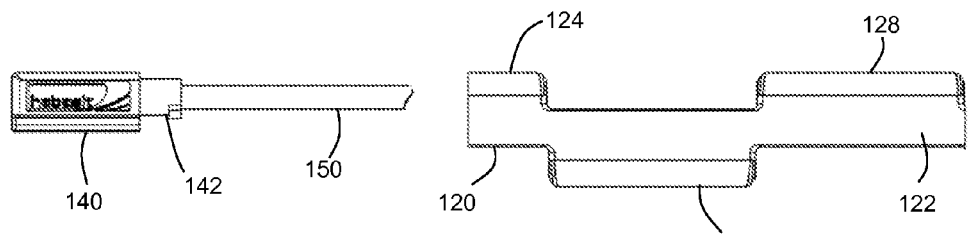
Fig. 6B
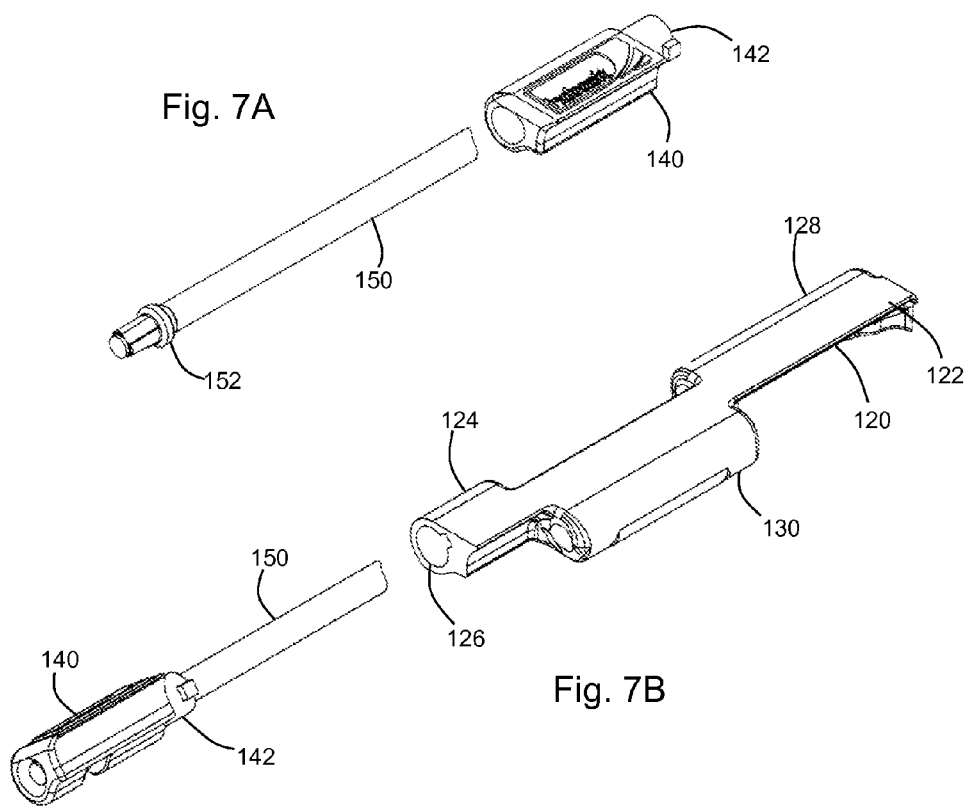
Fig. 7A
Fig. 7B

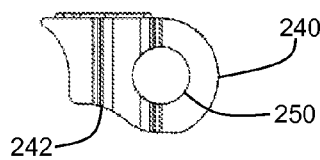
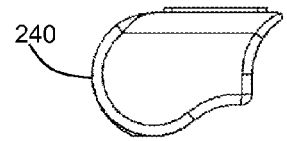
Fig. 8A                    Fig. 8B
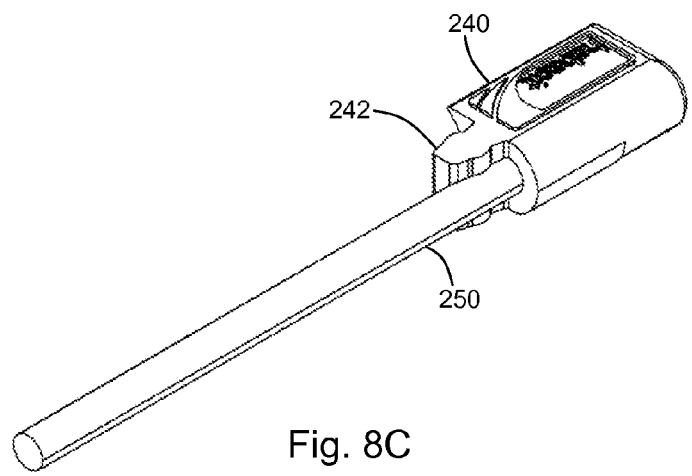
Fig. 8C
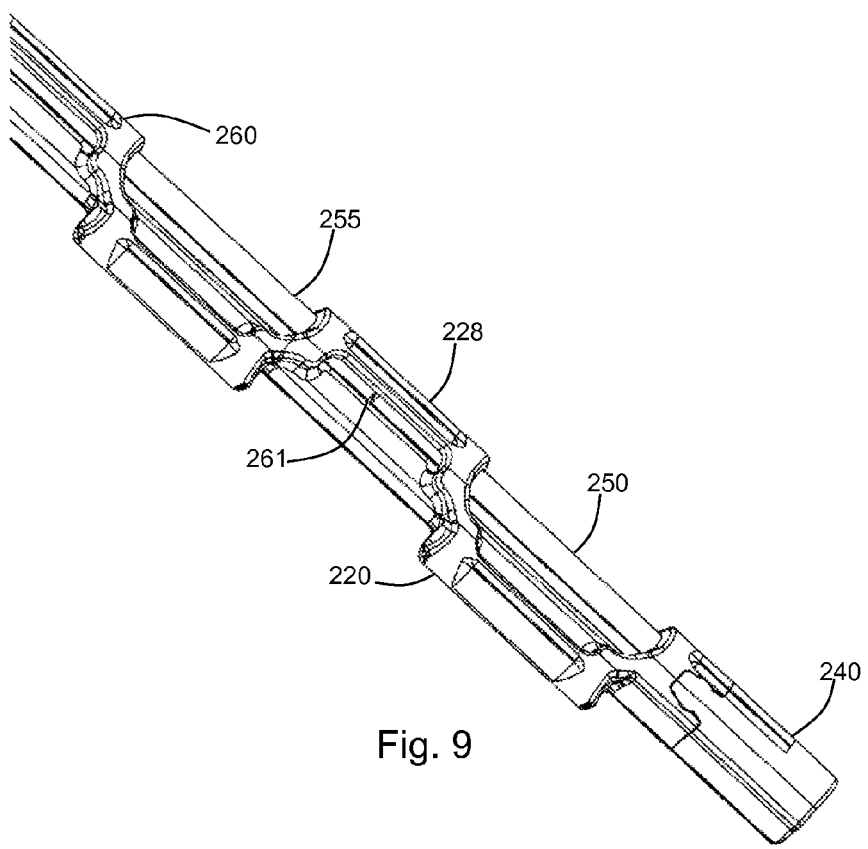
Fig. 9

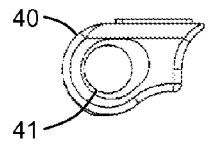
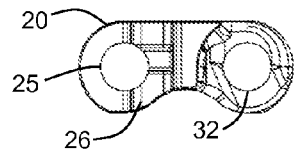
Fig. 10A  Fig. 10B
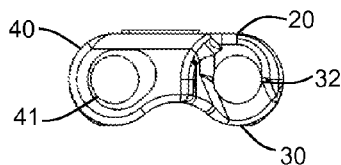
Fig. 10C
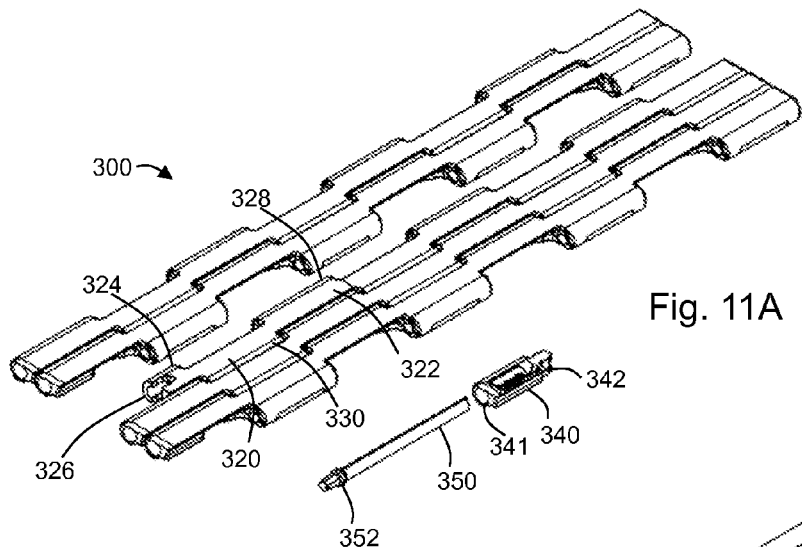
Fig. 11A
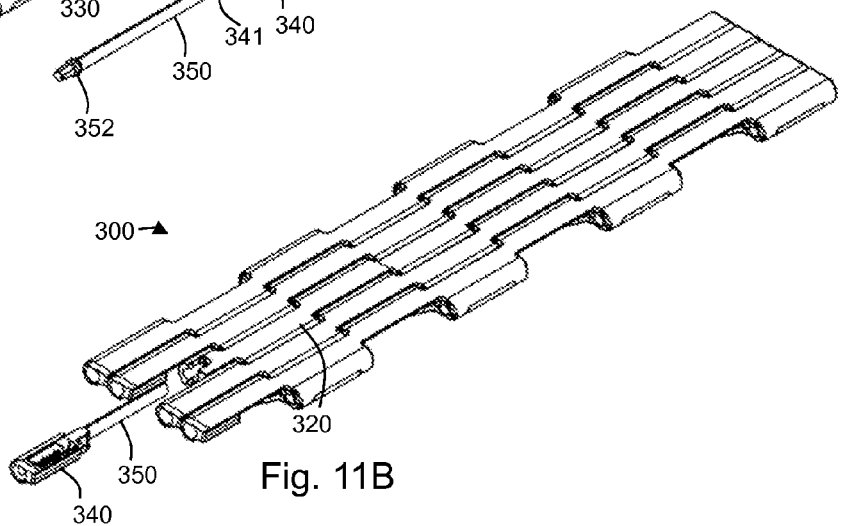
Fig. 11B

ROD RETENTION SYSTEM AND METHOD

FIELD OF THE INVENTION

The invention relates to modular belts, including chained and brick-laid modular conveyor belts.

BACKGROUND OF THE INVENTION

Modular plastic belts are designed as chains (one belt module in each row of the belt) or brick-laid belts (having more than one belt module in one or more rows). The belt modules have intercalated link ends with bores for pivot rods which hingedly join the module(s) to those of the adjacent rows. Pivot rod retaining provisions are necessary to avoid the rods from escaping of the belt.

Many modern modular conveyor belts have a small belt pitch, often 0.5 inch or smaller. Due to this small belt pitch there is very little space available for rod retaining systems such as clips or locks. Possible solutions are known in the art such as those disclosed in U.S. Pat. Nos. 5,645,160 and 7,108,127. In these cases the rod ends are furnished with retaining rings, which engage in the outermost links by a press fit or abutment of a ring against the link face. Although these solutions solve the problem of retaining the rod, in small pitch belts, extraction of the rod for disassembly remains difficult. This is particularly important for cleaning, maintenance, or repair of the belt. Therefore, there is a need for a rod retaining system, which is well retaining the rod but also allows easier extraction.

BRIEF SUMMARY OF THE INVENTION

The present disclosure provides belts (chains or brick-laid) use rod retaining systems similar to those disclosed in U.S. Pat. No. 5,645,160, but including a special end module for easier disassembly. The outer link end of the end module is altered to be narrower and furnished with a connecting structure. A separate cap piece is produced, providing a corresponding connecting structure suitable to connect to the outer link end of the end module such that the width of the outer combined pieces is substantially the same as the other link ends of the belt. The link cap is furnished with an opening allowing for assembly with a pivot rod, and in some embodiments, the link cap provides the previously known rod retaining structures.

The present disclosure also provide a method for assembling a modular belt, wherein the pivot rod is inserted into the link cap before the assembly is attached to the end module. The link cap provides for easier grip and more convenient removal of the pivot rod for disassembly of the module.

In another embodiment, the link cap includes an integrated rodlet, for more convenient assembly.

The disclosed belt module system may be used in a single row to assemble a belt. In other embodiments, the belt module system may be installed on every row of a belt, or any number of rows of the belt. Additionally, the belt module system may be installed on one or both side of a module row.

DESCRIPTION OF THE DRAWINGS

For a fuller understanding of the nature and objects of the invention, reference should be made to the following detailed description taken in conjunction with the accompanying drawings, in which:

FIG. 3A is a top view of a belt module system according to another embodiment of the present invention;

FIG. 3B is a top view of the belt module system of FIG. 3A with the link cap attached to the end module;

FIG. 3C is an orthogonal view of the belt module of FIG. 3B;

FIG. 3D is an orthogonal view of the belt module of FIG. 3A;

FIG. 3E is another orthogonal view of the belt module of FIGS. 3B and 3C;

FIG. 3F is another orthogonal view of the belt module of FIGS. 3A and 3D;

FIG. 4A is a top view of a pivot rod and link cap according to another embodiment of the present invention;

FIG. 4B is a top view of the assembled pivot rod and link cap of FIG. 4A and a belt module;

FIG. 5A is an orthogonal view of the pivot rod and link cap of FIG. 4A;

FIG. 5B is an orthogonal view of the assembled pivot rod and link cap and the belt module of FIG. 4B;

FIG. 6A is a top view of a pivot rod and link cap according to another embodiment of the present invention, wherein the link cap has a bayonet-type connector;

FIG. 6B is a top view of an end module and the assembled pivot rod and link cap of FIG. 6A;

FIG. 7A is an orthogonal view of the pivot rod and link cap of FIG. 6A;

FIG. 7B is an orthogonal view of the end module and the assembled pivot rod and link cap of FIG. 6B;

FIG. 8A is an end view of a link cap having an integrated rodlet according to another embodiment of the present invention;

FIG. 8B is an alternate end view of the link cap of FIG. 8A;

FIG. 8C is an orthogonal view of the link cap of FIGS. 8A and 8B;

FIG. 9 is a partial orthogonal detail of two rows of assembled modules showing the interface of a rodlet and a floating rod;

FIG. 10A is an end view of the link cap of FIG. 1A;

FIG. 10B is an end view of the end module of FIG. 1A;

FIG. 10C is an end view of the link cap and end module of FIGS. 10A and 10B;

FIG. 11A is an orthogonal view of a portion of a belt according to an embodiment of the present disclosure before assembly;

FIG. 11B is an orthogonal view of the belt portion of FIG. 11A during assembly;

DETAILED DESCRIPTION OF THE INVENTION

Figure 1A:
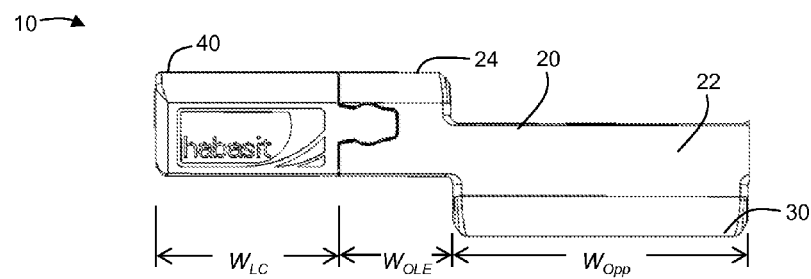
FIG. 1A is a top view of a belt module system according to an embodiment of the present invention.
Figures 1B, 1C:
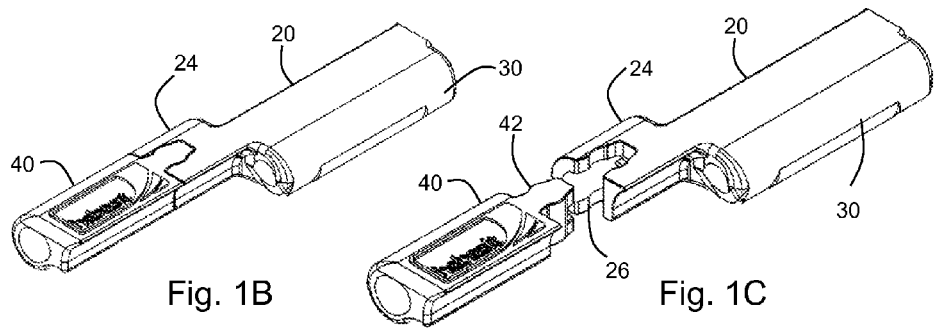
FIG. 1B is an orthogonal view of the belt module system of FIG. 1A.
FIG. 1C is an orthogonal view of the belt module system of FIGS. 1A and 1B, wherein the link cap is not attached to the end module.

With reference to FIGS. 1A-1C, the present disclosure may be embodied as a belt module system 10 for use with a modular belt, such as a conveyor belt. The system 10 comprises an end module 20 having an intermediate section 22. An outer link end 24 extends from the intermediate section 22 in a first direction, the first direction being parallel to the direction of belt travel (longitudinal direction). The outer link end 24 has a mating connector 26, further described below. The outer link end 24 has a transverse opening 25 through its width, the transverse opening 25 being suitable for a pivot rod for lacing modules together so as to form a belt.

In some embodiments, for example, the embodiment depicted in FIGS. 3A-3F, the end module 70 may comprise an inner link end 78 extending from the intermediate section 72 in the same direction as the outer link end 74—the first direction. The inner link end 78 having a transverse opening 79 through its width, the transverse opening 79 of the inner link end 78 being coaxially aligned with the transverse opening 75 of the outer link end 74.

The end module 70 has an opposing link end 80 extending from the intermediate section 72 in a second direction. The second direction is parallel to the direction of belt travel but opposite to the first direction. The opposing link end 80 is configured to interdigitate (intercalate) with link ends of an adjacent module. For example, the end module 70 may be installed in a belt so that the opposing link end 80 is interdigitated between the outer link end and the inner link end of an adjacent end module. In other belts, the end module 70 may be installed in a belt such that the opposing module is interdigitated between link ends of another type of module.

The opposing link end 80 has a transverse opening 82 extending through its width. The transverse opening 82 is configured to be coaxially aligned with the transverse openings of any interdigitated link ends. It should be noted that coaxially aligned should not be viewed to limit the transverse openings to be circular in shape, but broadly interpreted to describe that a pivot rod may be installed through the openings of interdigitated link ends. In this way, modules may be interconnected to form a belt.

The belt module system 60 further comprises a link cap 90 configured to attached to the outer link end 74 of the end module 70. The link cap 90 is used to retain a pivot rod when such a rod is installed through the transverse openings 75, 79 of the outer and inner link ends 74, 78. The link cap 90 has a corresponding connector 92 configured to mate with the mating connector 76 of the outer link end 76. In some embodiments, the mating connector 76 is a "female"-type connector and the corresponding connector 92 of the link cap 90 is a "male"-type connector. The connectors 76, 92 may engage with a press fit (sometimes referred to as a snap on), such as that depicted in FIGS. 1A-1C. In another embodiment, depicted in FIGS. 6A, 6B, 7A-7C, the connectors 126, 142 that engage with a bayonet connection, wherein the link cap 140 and its corresponding connector 142 must be rotated relative to the end module 120 for full engagement of the connectors 126, 142.

The belt module system 60 may further comprise a pivot rod 100 (FIGS. 4A, 4B, 5A, and 5B) configured to be disposed through the transverse openings of the outer and inner link ends 74, 78 of the end module 70. The link cap 90 is configured to retain the pivot rod 100. In some embodiments, the pivot rod 100 has a retaining ring 102 having a diameter $D_{ring}$ which is larger than a diameter $D_{rod}$ of the pivot rod 100 and the link cap 90 is configured to cooperate with the retaining ring 102 to prevent migration of the pivot rod 100 from its position when installed, as is known in the art (for example, with a ring slot 94 of the link cap 90 wherein the retaining ring 102 will be captured until urged by a removal force). In such embodiments, the link cap 90 is configured to have a transverse opening 91 which is coaxial with the transverse openings 75, 79 of the outer and inner link ends 74, 78. The transverse opening 91 of the link cap 90 may have a diameter which provides a tight fit (i.e., an interference fit) with the retaining ring of the pivot rod 100 such that the when the retaining ring 102 engages with the link cap 90, the pivot rod 100 must be urged into an installed position with a force.

In other embodiments, the link cap 90 may simply block movement of the pivot rod 100 from its position in the direction of the link cap 90. For example, in some embodiments, the link cap 90 may not have a transverse opening 91 such that the link cap 90 serves as an abutment for the pivot rod 100. The link cap 90 may have another type of abutment to prevent the pivot rod 100 from migrating out of the belt past the link cap 90. In another embodiment, the link cap 90 has a transverse opening that does not span the entire width of the link cap 90, but instead only part-way through the link cap 90, thereby creating a pocket in which the pivot rod 100 can reside. The In such embodiments, when installed in a belt, it may be advantageous to provide link caps 90 on each side of the belt in order to prevent movement of the pivot rod 100 in either of the axial directions.

In other embodiments, such as the embodiment depicted in FIGS. 8A-8C, the link cap 240 comprises an integrated rodlet 250. For example, the link cap 240 may be molded so as to include a rodlet 250. The rodlet 250 may be of any suitable length, including as long as the transverse width of a finished belt or longer (such that the rodlet may be trimmed to length once installed). In some embodiments, the rodlet 250 is less than the entire width of a particular belt. In such embodiments, the rodlet 250 serves to retain a floating rod 255 ("floater") in the proper position within a belt. FIG. 9 depicts a single module row of a belt where the rodlet 250 can be seen interfacing with a floater 255 at a point 261 within the inner link end 228 of an end module 220. The rodlet 250 may be sized to have a length such that the interface with the floater 255 occurs at any desirable position across the width of a belt.

It should be noted that the end module 70 is named as such because it is thought to be advantageous (though not required) to position the end module 70 at a transverse side (edge) of a belt. In such configurations, the "outer" link end 74 is positioned to be nearest the edge of the belt. It will be recognized that the belt module system 60 may further comprise a center module 260 having an intermediate section 262, and a plurality of first link ends 264 extending from the intermediate section 262 in the first direction. The center module 260 also includes a plurality of second link ends 268 extending in the second direction and configured to interdigitate with the plurality of first link ends 264. Transverse openings are located in the link ends 264, 268 such that a pivot rod 255 may interlock the interdigitated link ends 264, 268. More than one center module 260 may be used, and a wide belt may comprise many brick-laid modules.

Figure 17:
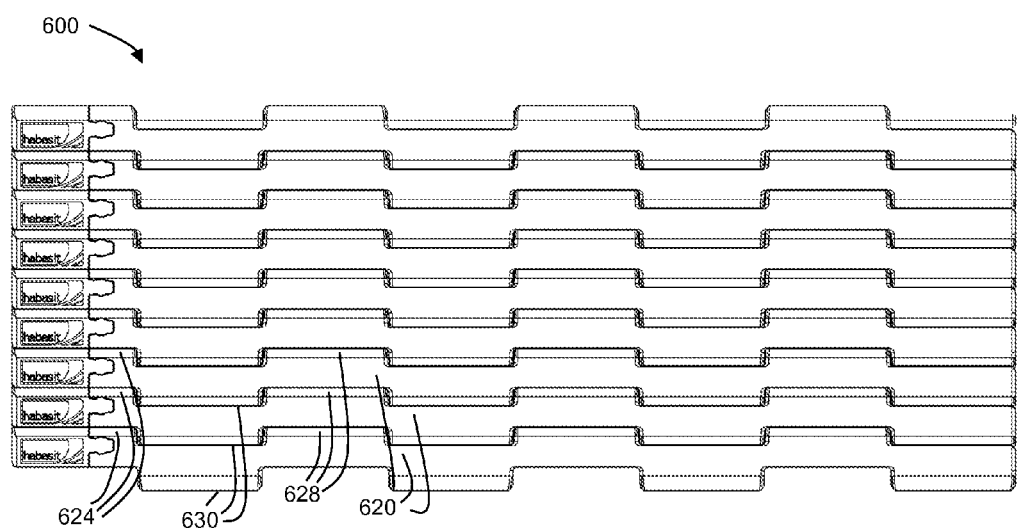
FIG. 17 is a top view of a portion of a belt according to another embodiment of the present invention.

In other embodiments, the end module 620 may comprise more than one inner link end and more than one opposing link end (see FIG. 17). In this way, a belt may be constructed by interdigitating the end modules 620 without the need for center modules for a brick-laid configuration. This configuration is often referred to as a chain.

The link cap 40 may have a cross sectional shape (when viewed along a longitudinal axis of the link cap—i.e., across the width of the belt) which is substantially the same as the cross-sectional shape of the outer link end 24. It should be noted that this may also be considered a combined cross-sectional shape of the outer link end 24 and the intermediate section 22, but solely for convenience and without limitation, reference is made in this disclosure to the outer link end 24. For example, in FIG. 10A, it can be seen that the cross-section of the link cap 40 has a shape (around the circumference) that is substantially the same as the cross-sectional shape of the outer link end 24 of the belt module 20 (see FIG. 10B). In this context, substantially should be interpreted broadly as being only limited by function. For example, in the exemplary embodiments described herein and depicted in, for example, FIGS. 10A-10C, link cap 40 includes a raised logo on its top surface which is not matched by the top surface of the outer link end 24. Depending on the application for which a particular belt is designed, this should be considered within the scope of substantially the same cross-sectional shape.

The link cap 90 may have further comprise an indicator 93 for distinguishing a belt module having a link cap 90 from traditional belt modules. In this way, personnel needing to operate on the belt can more readily identify the link cap(s) used to disassemble the belt. The indicator 93 may be noticeable based on, for example, visual appearance, texture, etc. The indicator 93 may be an embossed surface, a raised surface, a painted surface (e.g., silk-screened, printed, etc.), a differently colored portion, an overmolded portion, an insert, or any other type of indication, including combinations of different indication. For example, in the embodiments depicted in the figures, the indicator 93 comprises a raised logo of the belt manufacturer, which may be molded with the link cap 90.

In some embodiments, such as the embodiment depicted in FIG. 1A, the outer link end 24 has a transverse width $W_{OLE}$ that is less than the transverse width $W_{Opp}$ of the opposing link end 30. The link cap 40 may be designed to have a width $W_{LC}$ such that when the link cap 40 is attached to the outer link end 24, the combined width $W_{Combined}$ is substantially the same as $W_{Opp}$. $W_{Combined}$ may be selected to be any suitable width.

Figure 2:
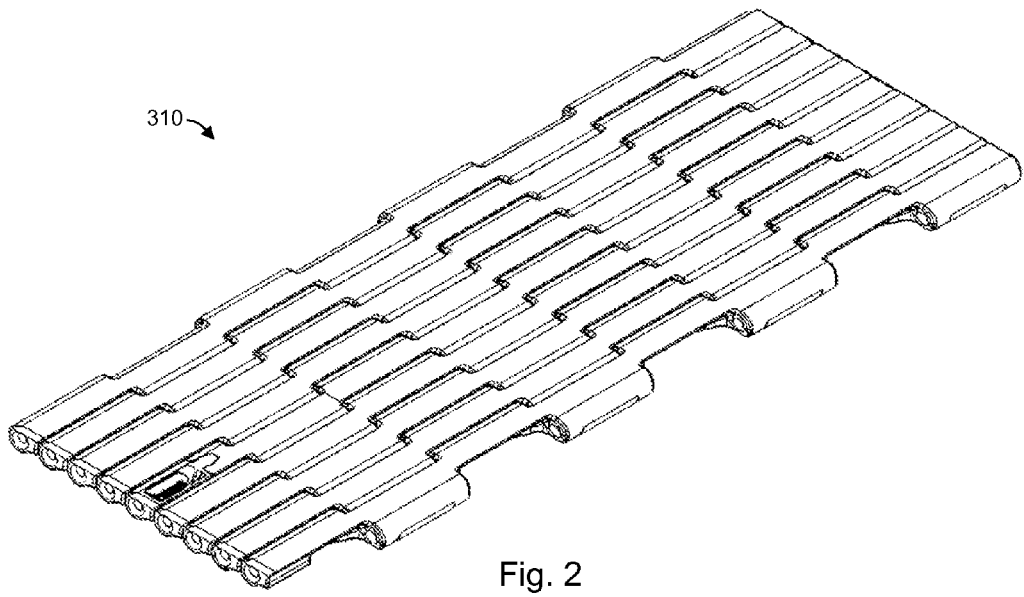
FIG. 2 is an orthogonal view of a belt portion having the belt module system of FIGS. 1A-1C installed.
Figure 7C:
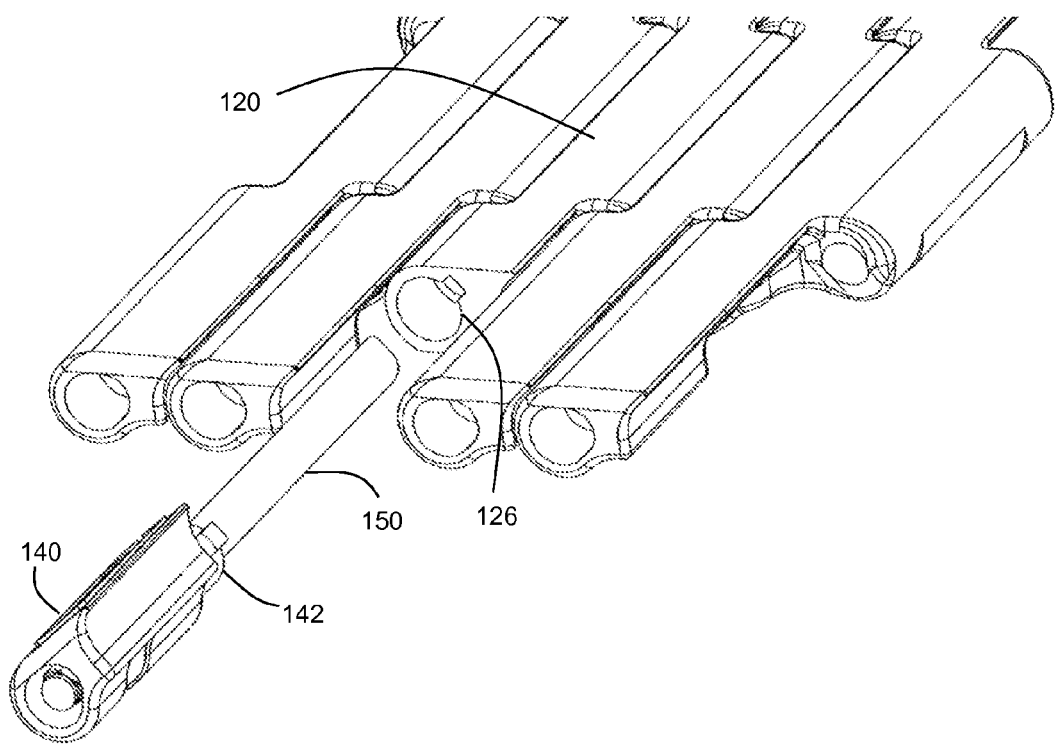
FIG. 7C is an orthogonal view of an assembled pivot rod and link cap and an assembly of belt modules, wherein the link cap has a bayonet connector.
Figure 12A:
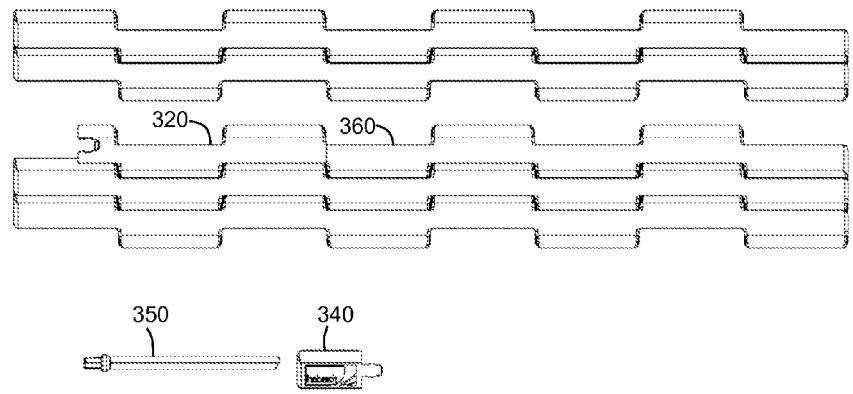
FIG. 12A is a top view of the belt portion of FIG. 11A.
Figure 12B:
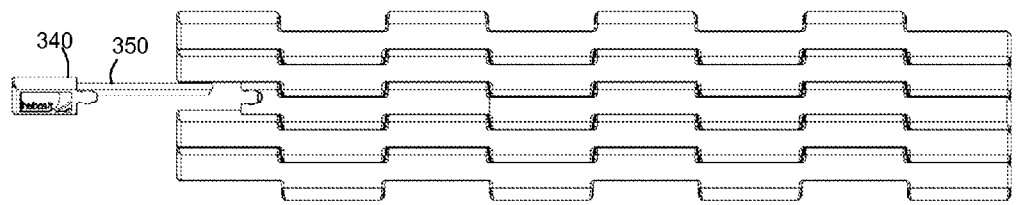
FIG. 12B is a top view of the belt portion of FIG. 11B.
Figure 13A:
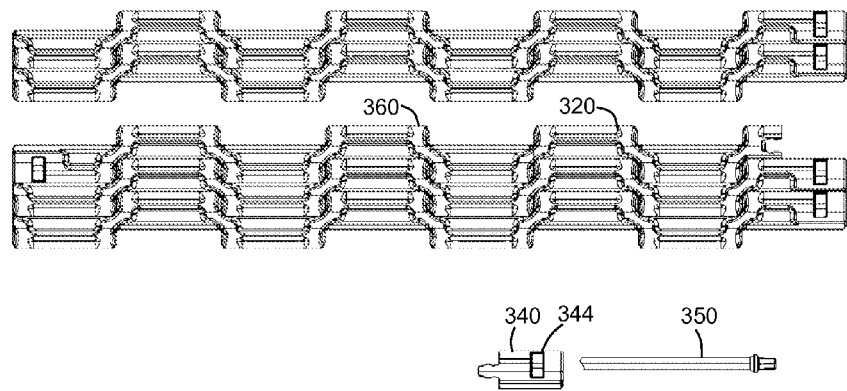
FIG. 13A is a bottom view of the belt portion of FIGS. 11A and 12A.
Figure 13B:
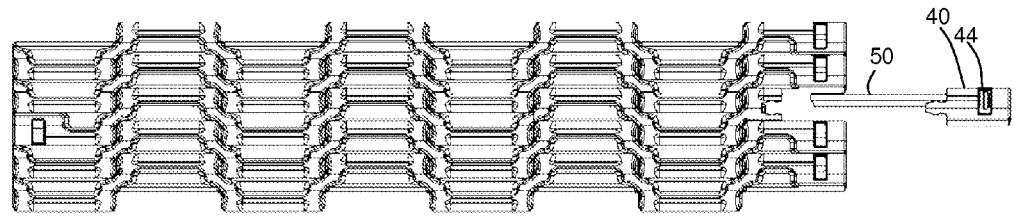
FIG. 13B is a bottom view of the belt portion of FIGS. 11B and 12B.
Figure 14:
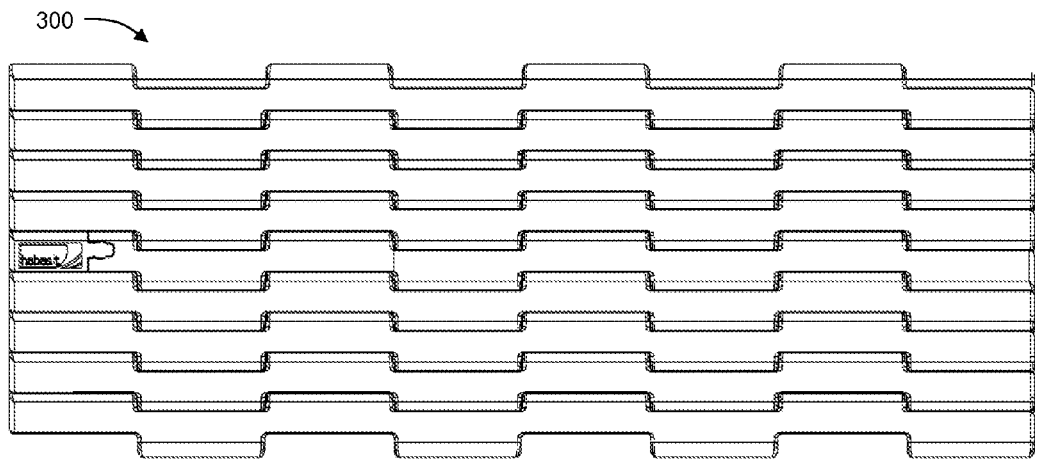
FIG. 14 is a top view of the assembled belt portion of FIGS. 11A-13B.
Figure 15:
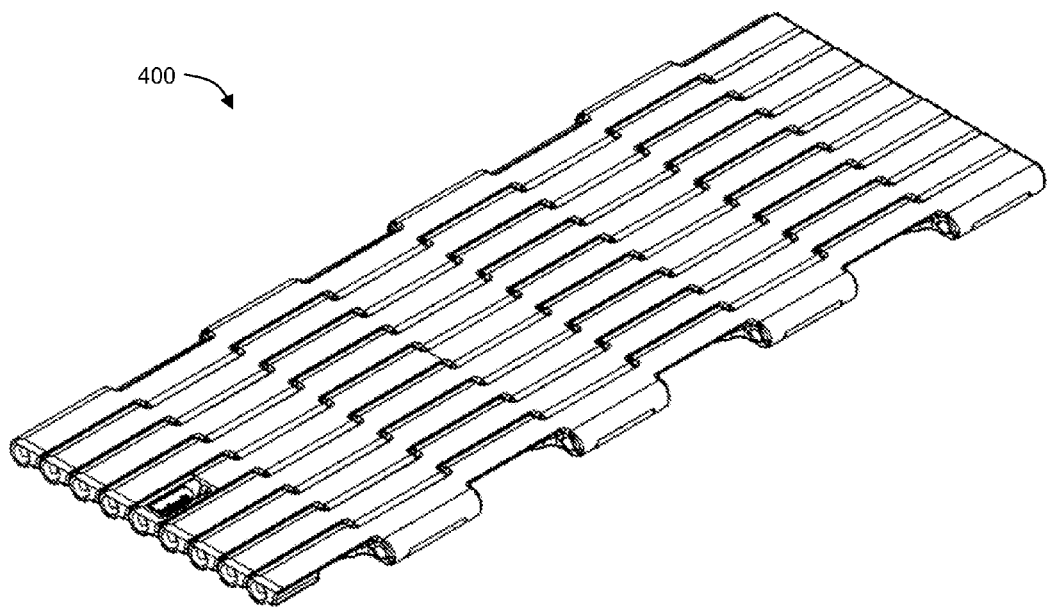
FIG. 15 is an orthogonal view of a portion of a belt according to another embodiment of the present invention.
Figure 16:
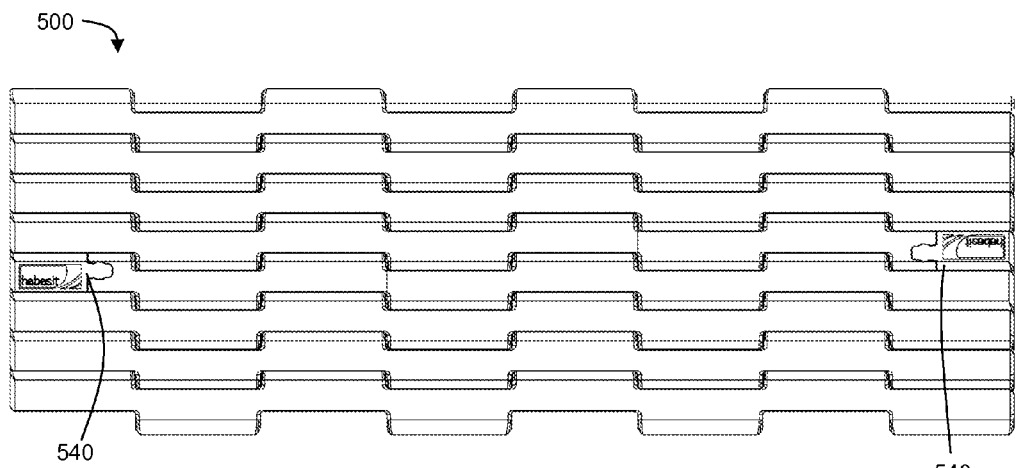
FIG. 16 is a top view of a portion of a belt according to another embodiment of the present invention.

The present disclosure may be embodied as a modular belt 300 having a belt module system as described above (FIGS. 11A-17, or belt 310 of FIG. 2). In this way, the modular belt 300 comprises a belt module 320 having an intermediate section 322. An outer link end 324 extends from the intermediate section 322 in a first direction, the first direction being parallel to the direction of belt 300 travel (longitudinal direction). The outer link end 324 has a mating connector 326. In some embodiments, an inner link end 328 may extend from the intermediate section 322 in the same direction as the outer link end 324—the first direction. The outer link end 324 and the inner link end 328 each include a transverse opening through the width of the link end 324, 328 for a pivot rod. As such, the transverse openings are coaxially aligned with one another.

The belt module 320 has an opposing link end 330 extending from the intermediate section 322 in a second direction. The second direction is parallel to the direction of belt 300 travel but opposite to the first direction. The opposing link end 330 is configured to interdigitate (intercalate) with link ends of an adjacent module. For example, FIG. 17 depicts an exemplary embodiment of a belt 600 wherein the belt module 620 may be installed in the belt 600 such that the opposing link end 630 is interdigitated between the outer link end 624 and the inner link end 628 of an adjacent belt module 620. In other belts, the end module may be installed in a belt such that the opposing module is interdigitated between link ends of another type of module (see, for example, FIGS. 15 and 16).

The opposing link end 330 has a transverse opening extending through its width. The transverse opening is configured to be coaxially aligned with the transverse openings of any interdigitated link ends. It should be noted that coaxially aligned should not be viewed to limit the transverse openings to be circular in shape, but broadly interpreted to describe that a pivot rod may be installed through the openings of interdigitated link ends.

The belt 300 further comprises a pivot rod 350 configured to be disposed through the transverse openings of the outer and inner link ends 324, 328 of the belt module 320. The belt 300 further comprises a link cap 340 configured to attached to the outer link end 324 of the belt module 320. The link cap 340 is used to retain the rod 350 in position through the transverse openings of the outer and inner link ends 324, 328. The link cap 340 has a corresponding connector 342 configured to mate with the mating connector 326 of the outer link end 324. In some embodiments, the mating connector 326 is a "female"-type connector and the corresponding connector 342 of the link cap 340 is a "male"-type connector. The connectors 326, 342 may engage with a press fit (sometimes referred to as a snap on), such as that depicted in FIGS. 16-17. In other embodiments, such as the belt 400 depicted in FIG. 15, the connectors engage with a bayonet connection (such as the connectors depicted in FIGS. 6A, 6B, and 7A-7C), wherein the link cap and its corresponding connector must be rotated relative to the end module for full engagement of the connectors.

In some embodiments, the pivot rod 350 has a retaining ring 352 having a diameter $D_{ring}$ which is larger than a diameter $D_{rod}$ of the pivot rod 350, and the link cap 340 is configured to cooperate with the retaining ring 352 to prevent migration of the pivot rod 350 from its position when installed, as is known in the art (for example, with a ring slot 344 of the link cap 340 wherein the retaining ring 352 will be captured until urged by a removal force). In such embodiments, the link cap 340 is configured to have a transverse opening 341 which is coaxial with the transverse openings of the outer and inner link ends 324, 328. In other embodiments, the link cap 340 may simply block movement of the pivot rod 350, from its position, in the direction of the link cap 340. In such embodiments of belts 500, it may be advantageous to provide link caps 540 on each side of the belt 500 in order to prevent movement of the pivot rod in either of the axial directions (see FIG. 16).

The belt module 620 may have more than one inner link end 628 and more than one opposing link end 630 such that a belt 600 may be built up by chaining belt modules 620, rather than bricklaying modules (see FIG. 17).

Figure 18:
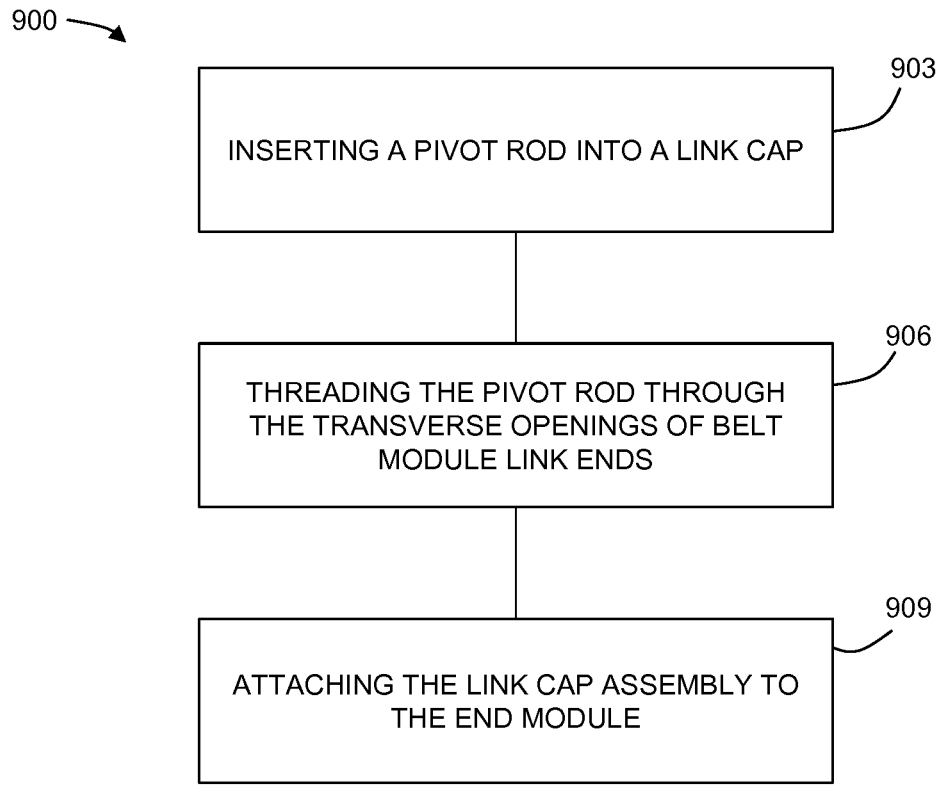
FIG. 18 is a flowchart depicting a method according to another embodiment of the present disclosure.

The present invention may be embodied as a method 900 for assembling a modular conveyor belt comprising the step of inserting 903 a pivot rod into a link cap (see FIG. 18). The method 900 further comprises the step of lacing 906 the pivot rod through transverse openings of interdigitated link ends of two adjacent belt modules. The link cap and pivot rod are then secured 909 to the end module of the module row. It should be noted that the order of steps in the method 900 is not fixed. For example, the modular conveyor belt may also be assembled by attaching 909 the link cap to the end module of a module row, and then lacing 906 a pivot rod through the transverse openings of interdigitated link ends, and then securing 903 the pivot rod into the link cap.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A modular belt, comprising:
   a belt module comprising:
      an intermediate section;
      an outer link end extending from the intermediate section in a first direction parallel to a direction of belt travel, the outer link end having a transverse opening defined therein and a mating connector; and
      an opposing link end extending from the intermediate section in a second direction opposite the first direction, the opposing link end configured to interdigitate with link ends of an adjacent module, the opposing link end having a transverse opening defined therein;
   a pivot rod disposed through the transverse openings of the outer end;
   a link cap for retaining the pivot rod, the link cap having a corresponding connector configured to mate with the mating connector of the outer link end; and
   wherein the link cap further comprises an integrated rodlet configured to be coaxial with the pivot rod.

2. The modular belt of claim 1, wherein the corresponding connector of the link cap is a plug connector.

3. The modular belt of claim 1, wherein the corresponding connector of the link cap is a bayonet connector.

4. The modular belt of claim 1, wherein the link cap is configured to abut the pivot rod.

5. The modular belt of claim 1, wherein the link cap is a different color than the color of other belt components.

6. The modular belt of claim 1, wherein the link cap has a cross-sectional shape which is substantially the same as the cross-sectional shape of the outer link end.

7. The module belt of claim 1, wherein the belt module further comprises one or more inner link ends extending from the intermediate section in the first direction, the one or more inner link ends having a transverse opening coaxial with the transverse opening of the outer link end.

8. The modular belt of claim 7, wherein the belt module comprises more than one inner link end and more than one opposing link end.

9. The modular belt of claim 1, wherein the pivot rod has a rod diameter and the pivot rod further comprises a retaining ring having a ring diameter greater than the rod diameter.

10. The modular belt of claim 9, wherein the link cap has a transverse opening coaxial with the transverse opening of the outer link end and the transverse opening of the link cap has a diameter which is less than the ring diameter of the pivot rod.

11. The modular belt of claim 1, wherein the link cap further comprises an indicator for distinguishing the link cap from other belt components.

12. The modular belt of claim 11, wherein the indicator is a raised surface design.

13. The modular belt of claim 11, wherein the indicator is a painted design.

14. The modular belt of claim 1, wherein the outer link end has a transverse width that is less than a transverse width of the opposing link end.

15. The modular belt of claim 14, wherein when the link cap is attached to the outer link end, a total transverse width of the link cap and outer link end is substantially the same as the transverse width of the opposing link end.

16. A belt module system, comprising:
   an end module comprising:
      an intermediate section;
      an outer link end extending from the intermediate section in a first direction parallel to a direction of belt travel, the outer link end having a transverse opening defined therein and a mating connector; and
      an opposing link end extending from the intermediate section in a second direction opposite the first direction, the opposing link end configured to interdigitate with link ends of an adjacent module, the opposing link end having a transverse opening defined therein;
   a link cap for preventing migration of a pivot rod when a pivot rod is installed, the link cap having a corresponding connector configured to mate with the mating connector of the outer link end; and
   wherein the link cap further comprises an integrated rodlet configured to be disposed through the transverse opening of the outer link end when the link cap is attached to the outer link end.

17. The belt module system of claim 16, wherein the corresponding connector of the link cap is a bayonet connector.

18. The belt module system of claim 16, wherein the corresponding connector of the link cap is a push connector.

19. The belt module system of claim 16, wherein the link cap has a transverse opening coaxial with the transverse opening of the outer link end and the transverse opening of the link cap is configured to cooperate with a retaining ring of a pivot rod to retain the pivot rod.

20. The belt module system of claim 16, wherein the link cap is configured to abut a pivot rod when installed.

21. The modular belt of claim 16, wherein the link cap is a different color than the color of the end module.

22. The belt module system of claim 16, wherein the link cap has a cross-sectional shape which is substantially the same as the cross sectional shape of the outer link end.

23. The belt module system of claim 16, further comprising:
   a center module comprising:
      an intermediate section;
      a plurality of first link ends extending from the intermediate section in the first direction, and each first link end having a transverse opening configured to align with the transverse opening of the outer link end when the center module abuts the end module; and
      a plurality of second link ends extending from the intermediate section in the second direction, the plurality of second link ends configured to interdigitate with the plurality of first link ends of an adjacent module, each second link end having a transverse opening and configured to align with the transverse opening of the opposing link end when the center module abuts the end module.

24. The belt module system of claim 16, wherein the end module further comprises one or more inner link ends extending from the intermediate section in the first direction, the one or more inner link ends having a transverse opening coaxial with the transverse opening of the outer link end.

25. The modular belt of claim 24, wherein the end module comprises more than one inner link end and more than one opposing link end.

26. The belt module system of claim 16, wherein the outer link end has a transverse width that is less than a transverse width of the opposing link end.

27. The belt module system of claim 26, wherein when the link cap is attached to the outer link end, a total transverse width of the link cap and outer link end is substantially the same as the transverse width of the opposing link end.

28. The modular belt of claim 16, wherein the link cap further comprises an indicator for distinguishing the link cap from other belt components.

29. The modular belt of claim 28, wherein the indicator is a raised surface design.

30. The modular belt of claim 28, wherein the indicator is a painted design.

31. A modular belt, comprising:
a belt module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a pivot rod disposed through the transverse openings of the outer end;
a link cap for retaining the pivot rod, the link cap having a corresponding connector configured to mate with the mating connector of the outer link end; and
wherein the corresponding connector of the link cap is a bayonet connector.

32. A modular belt, comprising:
a belt module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a pivot rod disposed through the transverse openings of the outer end;
a link cap for retaining the pivot rod, the link cap having a corresponding connector configured to mate with the mating connector of the outer link end; and
wherein the link cap has a cross-sectional shape which is substantially the same as the cross-sectional shape of the outer link end.

33. A belt module system, comprising:
an end module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a link cap for preventing migration of a pivot rod when a pivot rod is installed, the link cap having a corresponding connector configured to mate with the mating connector of the outer link end; and
wherein the corresponding connector of the link cap is a bayonet connector.

34. A belt module system, comprising:
an end module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a link cap for preventing migration of a pivot rod when a pivot rod is installed, the link cap having a corresponding connector configured to mate with the mating connector of the outer link end; and
wherein the corresponding connector of the link cap is a push connector.

35. A belt module system, comprising:
an end module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a link cap for preventing migration of a pivot rod when a pivot rod is installed, the link cap having a corresponding connector configured to mate with the mating connector of the outer link end; and
wherein the link cap has a cross-sectional shape which is substantially the same as the cross sectional shape of the outer link end.

36. A modular belt, comprising:
a belt module comprising:
an intermediate section;
an outer link end extending from the intermediate section in a first direction parallel to a direction of belt travel, the outer link end having a transverse opening defined therein and a mating connector; and
an opposing link end extending from the intermediate section in a second direction opposite the first direction, the opposing link end configured to interdigitate with link ends of an adjacent module, the opposing link end having a transverse opening defined therein;
a pivot rod disposed through the transverse openings of the outer end;
a link cap for retaining the pivot rod, the link cap having a corresponding connector configured to mate with the mating connector of the outer link end; and
wherein the outer link end has a transverse width that is less than a transverse width of the opposing link end.

37. The modular belt of claim 36, wherein when the link cap is attached to the outer link end, a total transverse width of the link cap and outer link end is substantially the same as the transverse width of the opposing link end.

38. A belt module system, comprising:
an end module comprising:
an intermediate section;

an outer link end extending from the intermediate section in a first direction parallel to a direction of belt travel, the outer link end having a transverse opening defined therein and a mating connector; and an opposing link end extending from the intermediate section in a second direction opposite the first direction, the opposing link end configured to interdigitate with link ends of an adjacent module, the opposing link end having a transverse opening defined therein;

a link cap for preventing migration of a pivot rod when a pivot rod is installed, the link cap having a corresponding connector configured to mate with the mating connector of the outer link end; and wherein the outer link end has a transverse width that is less than a transverse width of the opposing link end.

39. The belt module system of claim 38, wherein when the link cap is attached to the outer link end, a total transverse width of the link cap and outer link end is substantially the same as the transverse width of the opposing link end.

* * * * *